United States Patent [19]

Aoki

[11] E Re. 30,982

[45] Reissued Jun. 29, 1982

[54] TIME SHARED TONE KEYING SYSTEM IN ELECTRONIC MUSICAL INSTRUMENT

[75] Inventor: Eiichiro Aoki, Hamamatsu, Japan

[73] Assignee: Nippon Gakki Seizo Kabushiki Kaisha, Hamamatsu, Japan

[21] Appl. No.: 116,110

[22] Filed: Jan. 28, 1980

Related U.S. Patent Documents

Reissue of:

[64] Patent No.: 4,108,038
Issued: Aug. 22, 1978
Appl. No.: 671,861
Filed: Mar. 30, 1976

[30] Foreign Application Priority Data

Apr. 4, 1975 [JP] Japan ..... 50-41022
Apr. 8, 1975 [JP] Japan ..... 50-42670
Apr. 9, 1975 [JP] Japan ..... 50-43806

[51] Int. Cl.[3] ..... G10H 1/02
[52] U.S. Cl. ..... 84/1.19; 84/1.01
[58] Field of Search ..... 179/84 VF; 370/77, 110, 370/58, 112, 114; 84/1.19, 1.03, 1.01, 1.22, DIG. 9

[56] References Cited

U.S. PATENT DOCUMENTS 3,482,027 12/1969 Okamoto et al. ..... 84/1.03
3,548,065 12/1970 Freeman ..... 84/1.03
3,639,913 2/1972 Watson ..... 84/1.01 X
3,696,201 10/1972 Arsem et al. ..... 84/1.01
3,752,898 8/1973 Obatash ..... 84/1.01
3,773,981 11/1973 Stilwell et al. ..... 370/110
3,806,624 4/1974 Kniepkamp et al. ..... 84/1.03
3,875,842 4/1975 Kmetz ..... 84/1.01
3,916,750 11/1975 Uetrecht ..... 84/1.01
3,954,038 5/1976 Adams ..... 84/1.01
4,014,238 3/1977 Southard ..... 84/1.13
4,019,417 4/1977 Carlson ..... 84/1.01
4,028,979 6/1977 Luce ..... 84/1.24

*Primary Examiner*—J. V. Truhe
*Assistant Examiner*—Forester W. Isen
*Attorney, Agent, or Firm*—Spensley, Horn, Jubas & Lubitz

[57] ABSTRACT

In an electronic musical instrument, a tone source circuit provides tone signals of audio frequencies representing respective notes in a musical scale. A keyboard circuit provides a keying sequence pulses each existing at such a time slot of time sharing at an ultra-audible rate as is assigned to each of keys being depressed. The tone signals and the respectively corresponding keying sequence pulses are AND-gated respectively and then OR-gated commonly to produce a combined tone signal. The keying sequence pulses are obtained by sequentially scanning all the keys in the keyboard in one sequence, or may be equivalently obtained by scanning the same named keys in different octaves simultaneously and AND-gating with octave representing pulses. Or the octave representing pulses may be omitted by separately processing tone signals octave by octave. The system is suitable for digitalization and for production in IC configuration.

9 Claims, 17 Drawing Figures

TIME SHARED TONE KEYING SYSTEM IN ELECTRONIC MUSICAL INSTRUMENT

Matter enclosed in heavy brackets [ ] appears in the original patent but forms no part of this reissue specification; matter printed in italics indicates the additions made by reissue.

BACKGROUND OF THE INVENTION

This invention relates to improvements in an electronic musical instrument comprising tone sources capable of generating frequencies of notes corresponding to keys arranged in a keyboard.

In a prior art electronic musical instrument of a type which comprises tone sources capable of generating frequencies of the notes of the keys and selecting a required one from among such frequencies in accordance with depression of a selected key, all of tones source signals the number of which is the same as a total number of the keys in the keyboard (e.g. 61 if there are 61 keys) must be supplied separately and individually to a keyboard circuit. This construction requires the same number of connection lines as the total number of the keys. Accordingly, if an integrated circuit is employed in a portion (e.g. a tone source circuit) other than the keyboard circuit, a large number of connection pins (e.g. 61) are required for connecting such integrated circuit to the keyboard circuit. As the number of pins used increases, the manufacturing cost of the integrated circuit increases with resulting increase in the manufacturing cost of the electronic musical instrument.

SUMMARY OF THE INVENTION

It is, therefore, an object of the present invention to provide an electronic musical instrument capable of digitally processing signals in circuit portions connected to the keyboard circuit for facilitating employment of an integrated circuit for these circuit portions and thereby reducing the manufacturing cost.

It is another object of the invention to provide an electronic musical instrument capable of periodically or intermittently selecting high rate clock pulses in accordance with a tone source frequency corresponding to the depressed key, producing a musical tone waveshape on the basis of the selected pulses and digitally processing signals appearing in circuit portions after the keyboard circuit, thereby producing a musical tone signal with a signal-to-noise ratio which is much superior to the prior art electronic musical instrument.

It is another object of the invention to provide an electronic musical instrument capable of reducing the number of connection lines connecting the keyboard circuit to the other circuit portions for reducing the number of connection pins required for the employment of the integrated circuit. According to the present invention, the entire instrument can be made extremely compact at a greatly reduced manufacturing cost.

These and other objects and features of the invention will become apparent from the description made hereinbelow with reference to the accompanying drawings.

DESCRIPTION OF PREFERRED EMBODIMENTS

The principle of the invention will now be described with reference to an example shown in FIGS. 1–4 in which the keyboard has 60 keys in 5 octaves.

Figure 1:
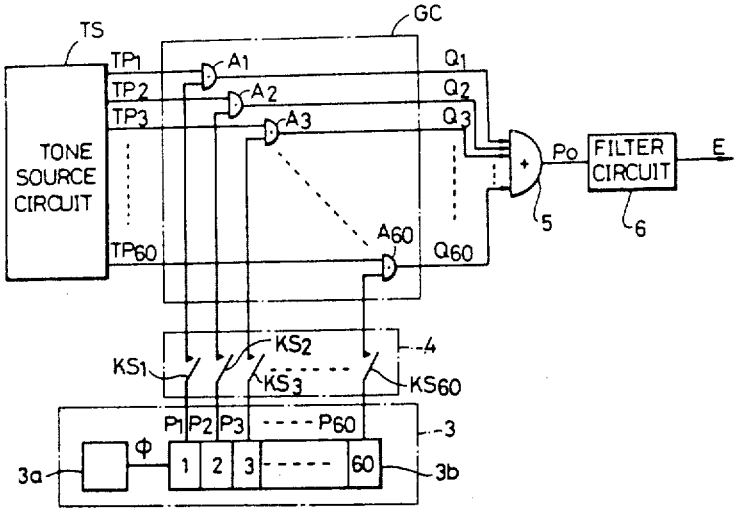
FIG. 1 is a block diagram schematically showing a construction of the electronic musical instrument according to the invention.
Figure 2:
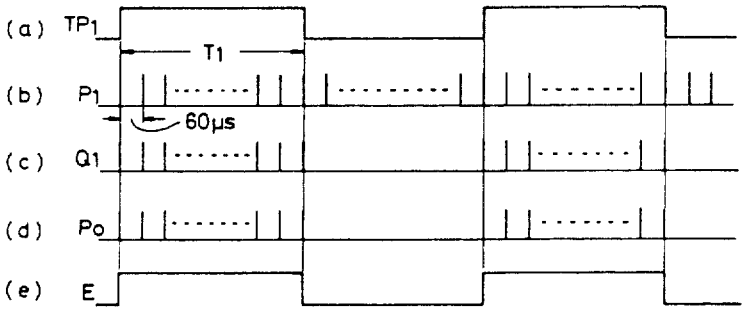
FIGS. 2 (a) through 2 (e) are graphical diagrams showing signals appearing in various circuit portions of the electronic musical instrument shown in FIG. 1 when a single key is being depressed.

Referring first to FIG. 1, a tone source circuit TS produces square waves tone source signals $TP_1$–$TP_{60}$ having frequencies representing respective notes in a musical scale and corresponding to respective keys (not shown) which are then applied to a gate circuit GC. The gate circuit GC is composed of AND circuits $A_1$–$A_{60}$ corresponding to the respective keys. Each of the tone source signals $TP_1$–$TP_{60}$ is applied to corresponding one of the AND circuits $A_1$–$A_{60}$. A sequence pulse generator 3 comprises a pulse generator 3a which produces a shift pulse $\phi$ with a pulse interval which is much shorter than that of the tone source signal, e.g. 1 $\mu$s and a scanning circuit 3b which is composed of suitable scanning means such as a shift register having stages corresponding in number to the number of the keys (i.e. 60 stages in the present example). The sequence pulse generator 3 causes a single signal "1" to be shifted sequentially and circulatingly to a next stage by means of the shift pulse $\phi$ and thereby produces sequence pulses $P_1$-$P_{60}$ corresponding to the respective keys one by one with a constant time delay (1 $\mu$s). These pulses $P_1$-$P_{60}$ are applied, as time shared keying sequence pulses, to the corresponding AND circuits $A_1$-$A_{60}$ through key switches $KS_1$-$KS_{60}$ of a key switch circuit 4. An OR gate 5 receives signals $Q_1$-$Q_{60}$ produced from the AND circuits $A_1$-$A_{60}$ and thereupon supplies a signal $P_0$ to a filter circuit 6. Alternatively stated, this OR circuit 5 produces the signal $P_0$ which is obtained by combining the signals $Q_1$-$Q_{60}$. The filter circuit 6 which consists of a low-pass filter removes the high frequency components of the pulses $P_1$-$P_{60}$ included in the signal $P_0$ and produces an audio signal E.

Assume now that only one key is being depressed. A corresponding key switch, e.g. $KS_1$, is closed and pulse $P_1$ is sequentially applied from the first stage of the shift register 3b to the AND circuit $A_1$ every 60 $\mu$s (FIG. 2(b)). The AND circuit $A_1$ also receives the tone source signal $TP_1$ (FIG. 2 (a)). The AND circuit $A_1$ is therefore enabled by application thereof of the tone source signal $TP_1$ and the pulse $P_1$ upon depression of the key and produces a signal $Q_1$ (Pulse $P_1$) only during a period of a square wave pulse width $T_1$ of the tone source signal $TP_1$. Since the gate circuit GC consists of AND circuits, the AND circuits corresponding to keys other than the depressed key are not enabled and the output of the gate circuit GC is the signal $Q_1$ only which is identical with the output $P_0$ (FIG. 2 (d)) of the OR circuit 5. The filter circuit 6 filters this signal $P_0$ and outputs the audio signal E (FIG. 2 (e)). This signal E corresponds to the tone signal $TP_1$.

Nextly, description will be made about a case wherein a plurality of keys, e.g. two keys, are simultaneously depressed. Assume that the key switches $KS_1$ and $KS_2$ are closed upon depression of the corresponding keys. The pulse $P_1$ is sequentially produced from the first stage of the shift register 3b every 60 $\mu$s in the previously described manner, whereas a pulse $P_2$ is sequentially produced from the second stage of the shift register 3b every 60 $\mu$s with a delay of 1 $\mu$s relative to the pulse $P_1$. These two kinds of pulses $P_1$ and $P_2$ are applied to the corresponding AND circuits $A_1$ and $A_2$. The AND circuits $A_1$ and $A_2$ also receive corresponding tone source signals $TP_1$ and $TP_2$ (FIGS. 3 (a) and (b)). The AND circuits $A_1$ and $A_2$ therefore are enabled only during square wave pulse widths $T_1$ and $T_2$ of the tone source signals $TP_1$ and $TP_2$ upon depression of the keys and produce signals $Q_1$ and $Q_2$ (FIGS. 3 (c) and (d)). The OR circuit 5 combines the signals $Q_1$ and $Q_2$ into the signal $P_0$ (FIG. 3 (e)) and supplies it to a filter 6. This signal $P_0$ has a close pulse interval in a portion where the tone source signals $TP_1$ and $TP_2$ overlap each other and a wide pulse interval in a portion where one of the signals $TP_1$ and $TP_2$ only is applied. The signal $P_0$ therefore include pulses of both close and wide intervals. Accordingly, a signal E (FIG. 3 (f)) having a level corresponding to the density of the pulse, i.e. a signal which is a result of combining the signals $TP_1$ and $TP_2$ together, is obtained by filtering the signal $P_0$ in the filter circuit 6.

Figure 3:
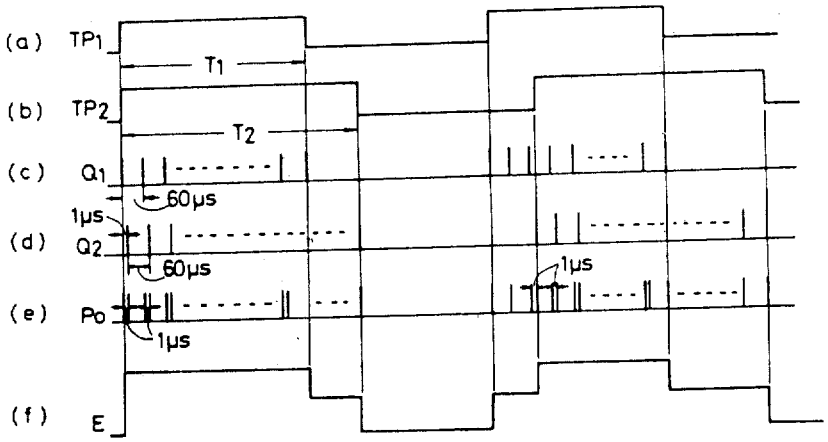
FIGS. 3 (a) through 3 (f) are graphical diagrams showing signals appearing in the circuit portions when two keys are being depressed.
Figure 4:
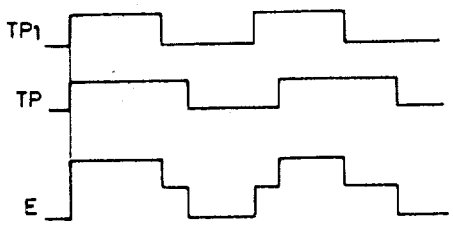
FIG. 4 is a graphical diagram showing the tone source signals and the combined output signal in a diminished time scale.

FIG. 4 shows the tone source signals $TP_1$, $TP_2$ and the signal E of FIG. 3 in a diminished scale for ready understanding of the state of overlapping of the tone source signals $TP_1$ and $TP_2$.

Figure 5:
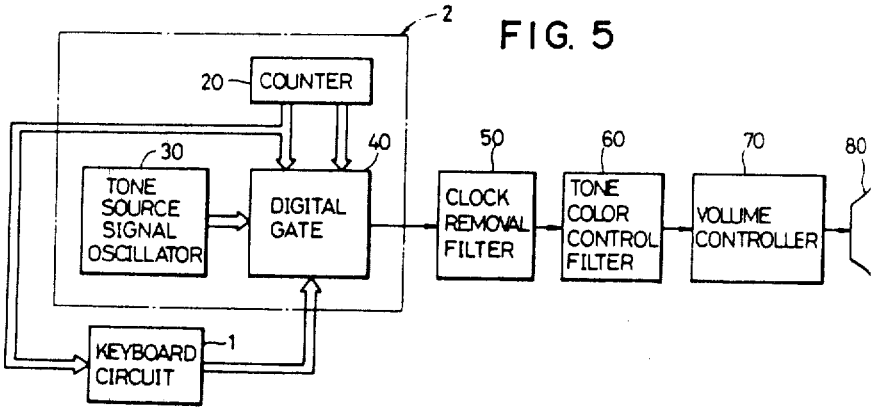
FIG. 5 is a block diagram showing an embodiment of the electronic musical instrument according to the invention.

FIG. 5 is a block diagram which generally shows an embodiment of the electronic musical instrument according to the invention. A keyboard circuit 1 comprises key switches corresponding to respective keys of the keyboard and being arranged in the form of a matrix circuitry. The matrix lines (i.e. input and output lines) of this matrix circuitry are connected to a digital IC part 2 (the term IC herein denoting an integrated circuit). The digital IC part 2 comprises a counter 20, a tone source signal oscillator 30 and a digital gate 40 which receives signals from the counter 20, the tone source signal oscillator 30 and the keyboard circuit 1. The counter 20 sequentially produces the note pulses and the octave pulses. The digital gate 40 periodically selects the note pulse of the depressed key in accordance with the musical tone frequency of the key. The output of the digital gate 40 is applied to a clock removal filter 50 which passes an audio frequency component. Through this filter, a high rate (i.e. high frequency) time sharing pulse component is removed and a tone source frequency is obtained. This tone source frequency is controlled in its tone color and volume through a tone color control filter 60 and a volume controller 70 and thereafter is audibly reproduced through an audio system 80.

Figure 6:
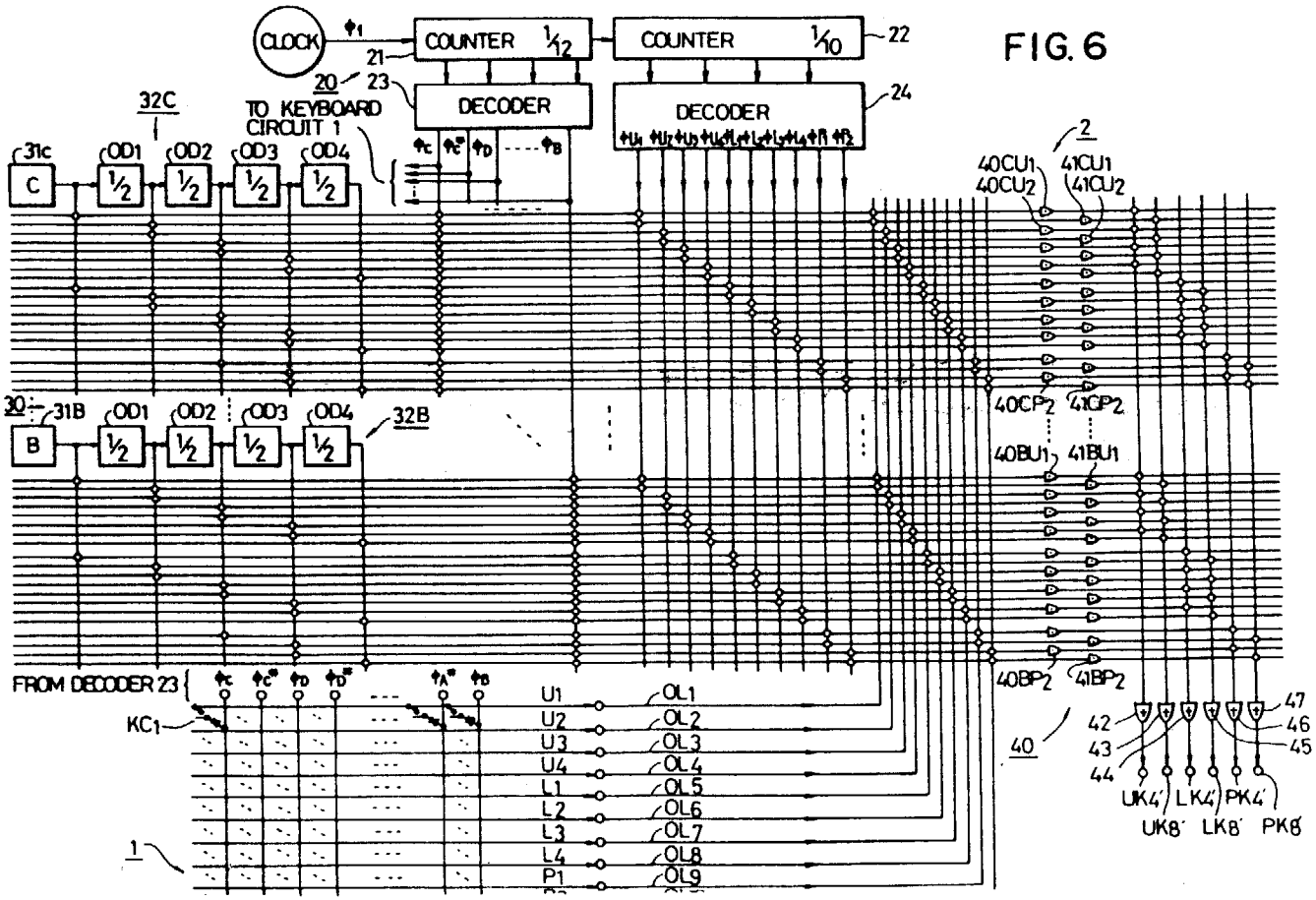
FIG. 6 is a circuit diagram showing an essential part of the embodiment shown in FIG. 5 in detail.

FIG. 6 illustrates an essential part of the instrument shown in FIG. 5. The keyboard circuit 1 consists of a matrix circuitry which is composed of column lines $IL_1$-$IL_{12}$ each designating a corresponding one of notes C, C#, D . . . A#, B in each octave and row lines $OL_1$-$OL_{10}$ each designating a kind of octave to which each of the notes C-B belongs (the figure showing, by way of example, the first to the fourth octaves $U_1$-$U_4$ of an upper keyboard, the first to the fourth octaves $L_1$-$L_4$ of the lower keyboard and the first and the second octaves $P_1$, $P_2$ of the pedal keyboard). The key switches are arranged in such a manner that the column line representing a particular note is connected to the row line representing a particular octave through a diode. Movable contacts are disposed on the column lines whereas stationary contacts are disposed on the row lines. When one of the key switches is closed, the corresponding column and row lines are connected and brought into conduction to each other.

Figure 7:
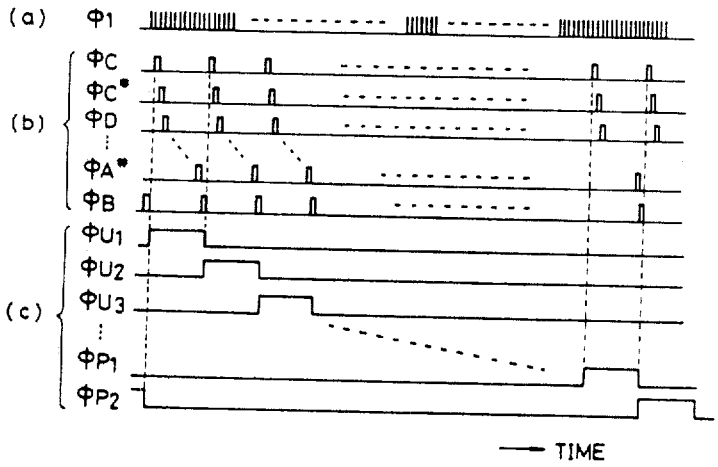
FIGS. 7 (a) through 7 (c) are timing charts showing time relations between various pulses used in the above embodiments.

The counter 20 comprises a duodecimal note counter 21 provided for sequentially counting clock pulses $\phi_1$ as shown in FIG. 7 (a) which are produced at a high rate (e.g. 1 MHz) and a decimal octave counter 22 provided for frequency dividing the outputs of the counter 21. The counted outputs of the note counter 21 are decoded into twelve different outputs in a decoder 23 and delivered out of the decoder 23 as note pulses $\phi_C$, $\phi_{C\#}$, $O_D$. . . $\phi_{A\#}$ and $\phi_B$ as shown in FIG. 7 (b). The note pulses $\phi_C$-$\phi_B$ respectively correspond to the 12 notes C-B within one octave, each note pulse occupying a different time slot from others. The note pulses $\phi_C$-$\phi_B$ are produced sequentially and repetitively. The counted outputs of the octave counter 22 are decoded into 10 different outputs in a decoder 24 and delivered out of the decoder 24 as octave pulses $\phi U_1$-$\phi U_4$, $\phi L_1$-$\phi L_4$, $\phi P_1$ and $\phi P_2$ as shown in FIG. 7 (c). The octave pulses $\phi U_1$-$\phi P_2$ respectively correspond to the octaves $U_1$-$P_2$, each octave pulse occupying a different time slot from others. The octave pulses $\phi U_1$-$\phi P_2$ also are produced sequentially and repetitively. The pulse width of each of these octave pulses $\phi U_1$-$\phi P_2$ is equal to a period of time during which the note pulses $\phi_C$-$\phi_B$ for one octave are produced, i.e. 12 periods of the note pulse.

The note pulses $\phi_C$-$\phi_B$ are applied to the corresponding column lines $IL_1$-$IL_{12}$ in the keyboard circuit 1. At a particular time slot, ON-OFF states of key switches of a corresponding note in all octaves are simultaneously detected.

The tone source signal oscillator 30 consists of 12 oscillators 31C, 31C#, . . . 31A#, 31B which produce frequencies of the notes C-B at the highest octave and 12 sets of frequency dividing circuits 32C, 32C#, . . . 32A#, 32B each set of which sequentially divides the frequency produced by the corresponding one of the oscillators 31C, 31C# . . . 31A#, 31B to produce frequencies of the corresponding note in the respective octaves. For convenience of explanation the oscillators 31C, 31B and the frequency dividing circuits 32C, 32B for the notes C and B only are shown in FIG. 6. Square wave signals with frequencies corresponding to the notes of the respective keys are produced by these oscillators 31C–31B and the frequency dividing circuits 32C–32B. Each of the frequency dividing circuits 32C–32B consists of a plurality of divide-by-two dividers $OD_1$–$OD_4$ connected in cascade connection.

Figure 8:
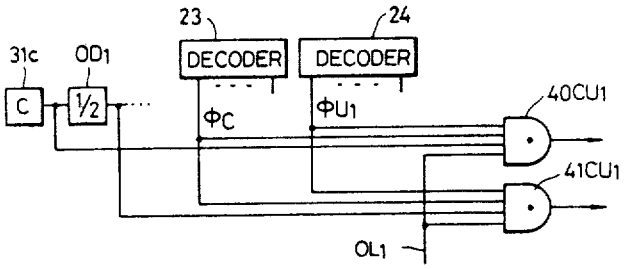
FIG. 8 is a timing chart showing connections to the input terminals of the AND circuits of FIG. 6.

The digital gate 40 comprises a plurality of AND circuits 40$CU_1$, 40$UC_2$, 40$CP_2$, . . . 40$BU_1$, 40$BU_2$, . . . 40$BP_2$ corresponding to the respective keys. For enabling production of both 4 foot (4') register tone and 8 foot (8') register tone, the digital gate 40 in the present embodiment further comprises AND circuits 41$CU_1$, 41$CU_2$, . . . 41$CP_2$, . . . 41$BU_1$, 41$BU_2$, . . . 41$BP_2$ . . . which are in the same number as the previous described AND circuits 40$CU_1$–40$BP_2$. Each of the AND circuits 40$CU_1$–41$BP_2$ receives input signals on vertical lines which are delivered through a horizontal line crossing the vertical lines at circled portions and connected to the input terminal of the AND circuit. FIG. 8 shows in an ordinary manner how these input signals are applied to the AND circuits 40$CU_1$–41$BP_2$, taking by way of example the AND circuits 40$CU_1$ and 41$CU_1$. It will be understood from this that each of the AND circuits 40$CU_1$–41$BP_2$ receives four kinds of input signals, namely (1) the square wave signal from the tone source signal oscillator 30 for the note frequency corresponding to the AND circuit, (2) the note pulse from the decoder 23 corresponding to the note of the key (one of the note pulses $\phi C$–$\phi B$), (3) the octave pulse from the decoder 24 representing the kind of octave to which the key belongs (one of the octave pulses $\phi U_1$–$\phi P_2$) and (4) the output of the row line (one of the row lines $OL_1$–$OL_{10}$) in the keyboard circuit 1 corresponding to the key. For example, the AND circuit 40$CU_1$ receives (1) the frequency signal from the oscillator 31C representing the note C at the highest octave of 4', (2) the note pulse $\phi C$ of the note C, (3) the octave pulse $\phi U_1$, representing the first octave $U_1$ of the upper keyboard and (4) the output of the row line $OL_1$ for the first octave of the upper keyboard. In the case of the AND circuit 41$CU_1$, the input signals described in (2), (3) and (4) above are the same but the frequency of a signal obtained by frequency dividing the output of the oscillator 31C by two is applied as the input signal described in (1) above since this AND circuit is for the 8 foot tone. The conditions (1)–(3) among the input conditions (1)–(4) of the AND circuits 40$CU_1$–41$BP_2$ are always satisfied whereas the input condition (1) is satisfied when the key is depressed.

Figure 9:
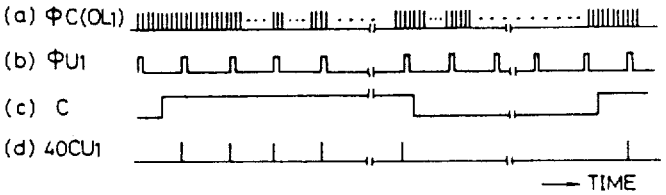
FIGS. 9 (a) through 9 (d) are timing charts showing input and output pulses appearing in various portions in FIG. 6.

If, for example, the key for the note C of the first octave $U_1$, of the upper keyboard is depressed, the key switch $KC_1$ of the keyboard circuit 1 is closed and the note pulse $\phi C$ for the note C is produced from the row line $OL_1$ of the keyboard circuit 1. The depressed key is detected by the kind of the row line on which the output is produced and the kind of the note pulse produced. Accordingly, the note pulse $\phi C$ is applied to the input terminal leading to the row line $OL_1$ of the AND circuit 40$CU_1$ corresponding to the key of the note C at the first octave of the upper keyboard (For convenience of explanation, description is made with respect only to the 4 foot tone and description about the AND circuit 41$CU_1$ is omitted). This note pulse $\phi C$ is applied to the AND circuit 40$CU_1$ also from the decoder 23. The manner of generation of the note pulse $\phi C$ is shown in FIG. 9 (a) in a diminished time scale as compared with FIG. 7. The AND circuit 40$CU_1$ also receives the octave pulse $\phi U_1$ representing the first octave $U_1$ of the upper keyboard as shown in FIG. 9 (b). This octave pulse $\phi U_1$ functions to distribute the note pulse to the respective octaves and, accordingly, one note pulse $\phi C$ is picked up whenever the octave pulse $\phi U_1$ is generated. The AND circuit 40$CU_1$ further receives the square wave frequency signal for the note C at the first octave $U_1$ of the upper keyboard supplied from the oscillator 31 as shown in FIG. 9 (c). During each half cycle of this square wave signal when it is "1" (an active level), the note pulse $\phi C$ is picked up in synchronization with generation of the octave pulse $\phi U_1$ and periodically delivered out of the AND circuit 40$CU_1$ as shown in FIG. 9 (d). If the master clock $\phi_1$ is 5 MHz, the frequency of the octave pulse $\phi U_1$ is $5{,}000 \div 12 \div 10 \approx 40$ KHz. Accordingly, the frequency of the note pulse $\phi C$ selected in synchronization with the octave pulse $\phi U_1$ is in the order of 40 KHz which is beyond the audio frequency. If the square wave frequency of the note C is in the order of 2093 Hz at the maximum, about 10 note pulses $\phi C$ are selectively produced during the half cycle of the square wave as shown in the figure.

The other AND circuits 40$CU_2$–41$BP_2$ operate in the same manner as has been described above. In the respective AND circuits 40$CU_1$–41$BP_2$, the note pulses $\phi C$–$\phi B$ are selected by the octave pulses $\phi U_1$–$\phi P_2$ with some time lag between each other. Accordingly, the time slots of the note pulses $\phi C$–$\phi B$ selectively produced from the AND circuits 40$CU_1$–41$BP_2$ do no coincide with each other. It should be noted that time slots for different notes in no case coincide with each other since the note pulses $\phi C$–$\phi B$ are produced at different times but that time slots generally coincide with each other in a case where the same note (C-B) at the different octaves ($U_1$–$P_2$) are produced. If time slots coincide, detection of the kind of octave to which the particular note belongs is not possible in a synthesizing process to be made in a post-stage digital circuit (OR circuit). If, for example, note pulses are selected in accordance with square wave frequencies of the same note but differing in tone pitch by one octave and thereafter are synthesized into a single kind of signal in an OR circuit, there occurs inconvenience that a low frequency component only is produced from the OR circuit if the time slots of the selected note pulses coincide with each other. To eliminate this inconvenience, the instrument according to the invention is so constructed that the note pulses $\phi C$–$\phi B$ are selected by the octave pulses $\phi U_1$–$\phi P_2$ with some time lag between each other so that the time slots of the note pulses $\phi C$–$\phi B$ selected periodically in accordance with the respective square wave frequencies will not coincide with each other. According to this arrangement, the outputs of the AND circuits 40$CU_1$–41$BP_2$ can be synthesized into a small number of output lines in an OR circuit with resulting reduction in the number of output connection pins used in the digital IC portion.

In the embodiment shown in FIG. 6, the outputs of the AND circuits 40UU$_1$-40BP$_2$, 41CU$_1$-41BP$_2$ are combined by the kind of the keyboard. More specifically, the outputs of the AND circuits among the AND circuits 40CU$_1$-40BP$_2$ corresponding to the upper keyboard ($U_1$-$U_4$) are applied to an OR circuit 42 and provided therefrom as a composite 4 foot upper keyboard tone UK4'. The outputs of the AND circuits among the AND circuits 40CU$_1$-40BP$_2$ corresponding to the lower keyboard ($L_1$-$L_4$) are applied to an OR circuit 44 and provided therefrom as a composite 4 foot lower keyboard tone LK4'. The outputs of the AND circuits among the AND circuits 40CU$_1$-40BP$_2$ corresponding to the pedal keyboard ($P_1$, $P_2$) are applied to an OR circuit 46 and provided therefrom as acomposite 4 foot pedal keyboard tone PK4'. Similarly, the outputs of the AND circuits 41CU$_1$-41BP$_2$ corresponding to the upper, lower and pedal keyboards are respectively applied to OR circuits 43, 45 and 47. These OR circuits 43, 45 and 47 thereupon produce composite 8' upper, lower and pedal keyboard tones. In FIG. 6, connections of the input terminals of the OR circuits 42-47 are illustrated in the same manner as in the case of the AND circuits 40UU$_1$-41BP$_2$.

Figure 10:
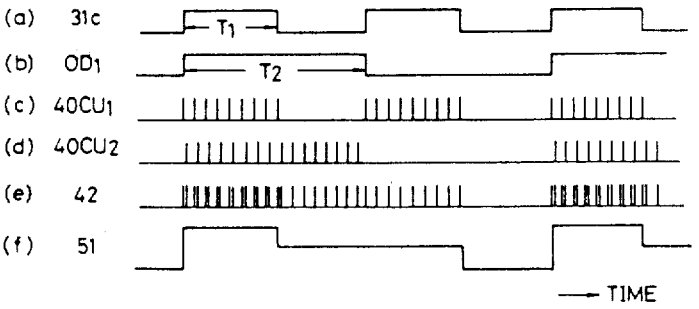
FIGS. 10 (a) through 10 (f) are timing charts showing input and output pulses appearing in various portions of FIGS. 6 and 11.

Assume, for example, that keys for the note C at the first octave $U_1$ and the note C at the second octave $U_2$ of the upper keyboard are simultaneously depressed. Since relation between the square wave frequency from the oscillator 31C and the square wave frequency from the divide-by-two divider OD$_1$ is as shown in FIGS. 10 (a) and 10 (b), the AND circuits 40CU$_1$ and 40CU$_2$ produce output as shown in FIGS. 10 (c) and 10 (d). Although the signals in FIG. 10 are shown in a diminished time scale as compared with the signals in FIG. 9, the interval of the selected note pulse $\phi$C is not in exact proportion to that shown in FIG. 5. As will be apparent from the figure, periods during which the note pulse $\phi$C is intermittently selected coincide with periods of the musical tone frequency. The outputs of the AND circuits 40CU$_1$ and 40CU$_2$ are applied to the OR circuit 42 which thereupon produces a composite signal as shown in FIG. 10 (e). This composite signal consists of pulses of a close interval and pulses of a wide interval. The pulse interval of the composite signal is close in a portion where amplitude levels of the musical tone signal overlap each other and wide in a portion where the amplitude levels do not overlap each other.

In the foregoing manner, the composite signals UK4'-PK8' consisting of pulses of both close and wide intervals are produced from the OR circuits 42-47 and supplied to a post-stage circuit as the output musical tone signal of the digital IC portion 2.

Figure 11:
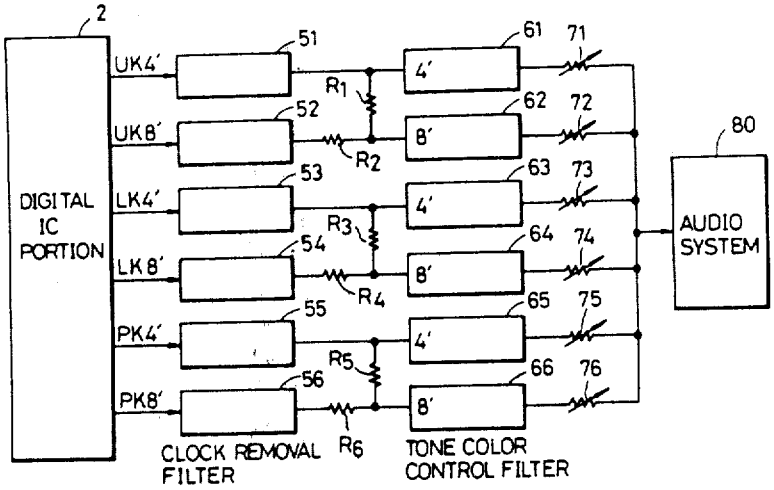
FIG. 11 is a block diagram showing an example of the analog processing system of FIG. 5.

The output composite signals UK4'-PK8' of the digital IC portion 2 are applied to clock removal filters 51-56 as shown in FIG. 11 where high frequency (i.e. above the audio frequency) pulse component is removed and the musical tone frequency (square wave frequency) component only is delivered out. These filters 51-56 may be composed of low-pass filters in which a non-audible high frequency is used as a cut-off frequency. The composite signal shown in FIG. 10 (e) has its clock component removed in the filter 51 and an audio frequency signal component whose level is high in a close pulse density portion and low in a coarse pulse density portion as shown in FIG. 10 (f) is obtained. It will be understood that this audio frequency signal component is substantially the same as a waveshape formed by overlapping the waveshapes of FIGS. 10 (a) and 10 (b) together in an analog manner, namely a waveshape formed by overlapping the musical tone frequencies.

The outputs of the clock removal filters 51-56 are respectively applied to corresponding tone color control filters 61-66 where the signals are controlled in tone in accordance with the kind of the keyboard and the 4 foot and 8 foot tones. Frequency levels of the 4 foot tone and the 8 foot tone are added together by each of the keyboards through resistors $R_1$, $R_2$ or $R_3$, $R_4$ or $R_5$, $R_6$ and thereafter applied to the filters 62, 64 and 66 for the 8 foot tone. This arrangement is provided for forming a step-wise waveshape including abundant harmonic content. The outputs of the tone color control filters 61-66 are separately adjusted in volume in volume control resistors 71-76 and thereafter are audibly reproduced from an audio system 80.

Figure 12:
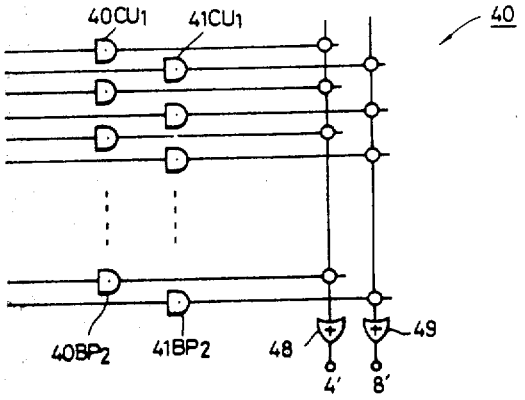
FIG. 12 is a circuit diagram showing a modified example of a circuit portion of the embodiment shown in FIG. 6.

In the examples shown in FIGS. 6 and 11 which can effect tone and volume controls by each keyboard, the six OR circuits 42-47 are used in the digital IC portion 2 and, accordingly, the number of the output connection pins is 6. It will be appreciated, however, that the number of the output connection pins can be further reduced if the tone and volume are controlled commonly throughout all of the keyboards. In an example shown in FIG. 12, the outputs of AND circuits 40CU$_1$-40BP$_2$ for the 4 foot tone in a digital gate 40 are all applied to an OR circuit 48, whereas the outputs of AND circuits 41CU$_1$-41BP$_2$ for the 8 foot tone are all applied to an OR circuit 49. According to this arrangement, notes of all the keyboards are combined on a single line. In the example shown in FIG. 8, signals representing the 4 foot tone and the 8 foot tone are combined on different lines. If the 8 foot tone only is to be sounded, a single OR circuit may be employed. In the above described examples, the counter 20 may be constructed of a suitable device such as a ring counter.

The keyboard circuit 1 in the foregoing embodiment receives the note pulses $\phi$C-$\phi$B bit it may be modified in such a manner that it will receive the octave pulses $\phi U_1$-$\phi P_2$. In this case, the lines $OL_1$-$OL_{10}$ corresponding to the different octaves are deemed as column lines and the octave pulses $\phi U_1$-$\phi P_2$ corresponding to the column lines $OL_1$-$OL_{10}$ are separately applied to the keyboard circuit 1 on these column lines. The lines $IL_1$-$IL_{12}$ corresponding to the respective notes are deemed as row lines and outputs (i.e. octave pulses) are produced on these row lines $IL_1$-$IL_{12}$ upon depression of the key. In this modified case, the manner of connection of the input terminals of the AND circuits 40CU$_1$-41BP$_2$ in the digital IC portion 2 is different from that shown in FIG. 2. The outputs of the row lines $IL_1$-$IL_{12}$ for the respective notes are applied to the corresponding AND circuits 40CU$_1$-41BP$_2$. Since the outputs of the row lines $IL_1$-$IL_{12}$ are distinguishable in respect of the kind of octave, there is no need for applying the octave pulses $\phi U_1$-$\phi P_2$ from the decoder 24 to the AND circuits 40CU$_1$-41BP$_2$ and, accordingly, inputs to the AND circuits 40CU$_1$-41BP$_2$ can be reduced to three kinds of inputs, namely the signals from the tone source generator 30, the note pulses $\phi$C-$\phi$B from the decoder 23 and the outputs of the row lines $IL_1$-$IL_{12}$ of the keyboard circuit 1.

FIGS. 13-17 show another embodiment of the electronic musical instrument according to the invention. This embodiment is different from the previously described embodiment in that it lacks the counter 22 and the decoder 24 and that the outputs of AND circuits 40$CU_1$-40$BP_2$ and 41$CU_1$-$BP_2$ are combined by the footage and the kind of octave and thereafter are controlled in their tone color by the kind of octave. In all other respects, the present embodiment is the same as the previously described one so that description thereof will be omitted.

Figure 13:
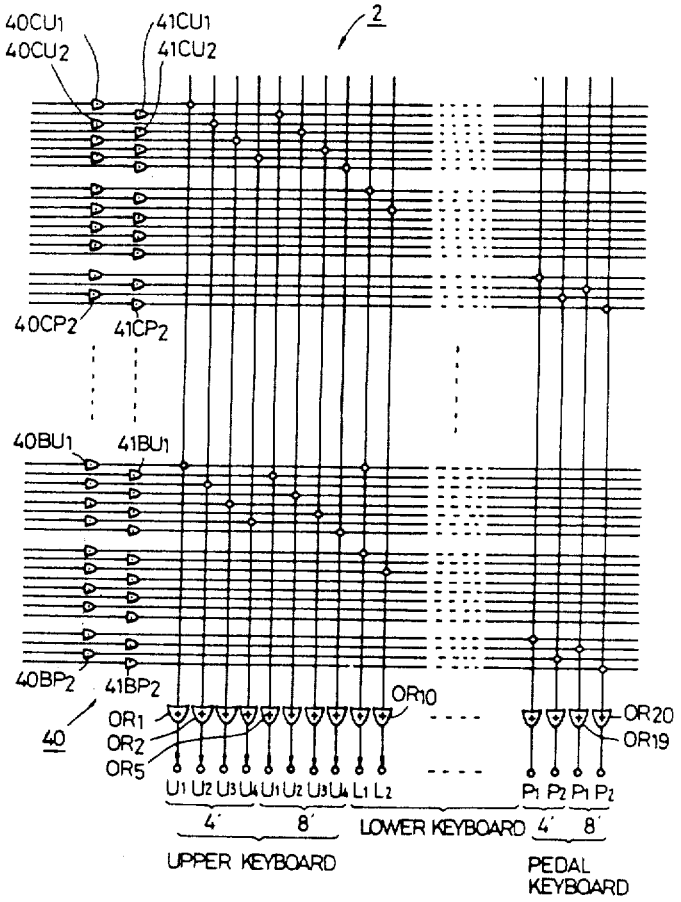
FIG. 13 is a circuit diagram showing another embodiment of the electronic musical instrument according to the invention.

Referring to FIG. 13, the outputs of the AND circuits 40$CU_1$-40$BP_2$ and 41$CU_1$-41$BP_2$ are applied to OR circuits $OR_1$-$OR_{20}$ by the kind of octave i.e. $U_1$-$P_2$, and by the footage of the tone, i.e. 4 foot and 8 foot. For example, the outputs of the AND circuits 40$CU_1$, 40C#$U_1$, . . . 40$BU_1$ and 41$CU_1$, 41C#$U_1$, . . . 41$BU_1$ corresponding to the first octave $U_1$ of the upper keyboard are applied to the OR circuit $OR_1$ provided for the 4 foot tone of the first octave of the upper keyboard and the OR circuit $OR_5$ provided for the 8 foot tone of the first octave of the upper keyboard. Each of the OR circuits $OR_1$-$OR_{20}$ produces a tone source signal for the 4 foot tone which is a composite signal of the outputs of the AND circuits collected by the kind of octave.

Figure 14:
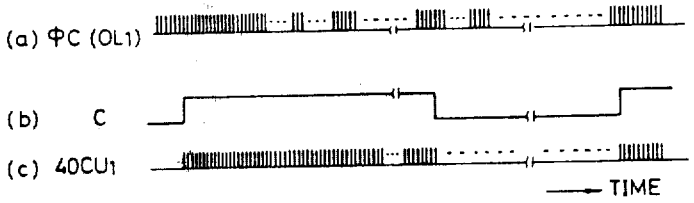
FIGS. 14 (a) through 14 (c) are timing charts for explaining operations of some circuit portions of the embodiment shown in FIG. 13.
Figure 16:
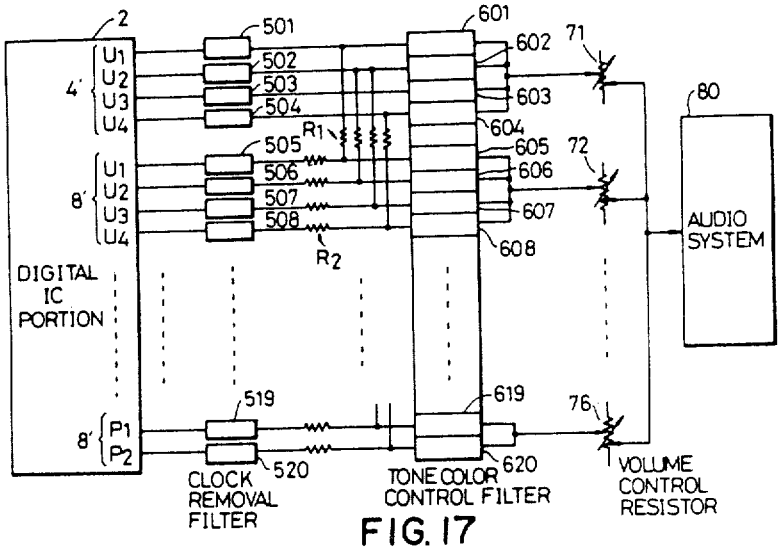
FIG. 16 is a circuit diagram showing tone color and volume controls performed in the embodiment shown in FIG. 13.

The outputs of the OR circuits $OR_1$-$OR_{20}$ are supplied to a clock removal filter 50 as the output of a digital IC portion 2. FIG. 16 shows clock removal filters 501-520 provided for the respective octave kinds (the OR circuits $OR_1$-$OR_{20}$). The filters 501-520 which consist of low-pass filters using non-audio high frequencies as the cut-off frequency remove the note pulse components which are high frequencies above the audio frequency and outputs tone source frequency components only. Accordingly, the clock removal filters 501-520 remove high rate note pulse components as shown in FIG. 14 (c) and pass tone source frequency components as shown in FIG. 14 (b). Since the frequency of the note pulses ($\phi$C-$\phi$B) is relatively high (e.g. 80 kHz), the note pulses are produced at a high density. Accordingly, this embodiment is advantageous in that the level of the output pulses of the filters 501-520 (a waveshape as shown in FIG. 14 (b)) can be made relatively high. This means that the level of the musical tone signal can be made high and an excellent signal-to-noise ratio can be obtained.

Figure 15:
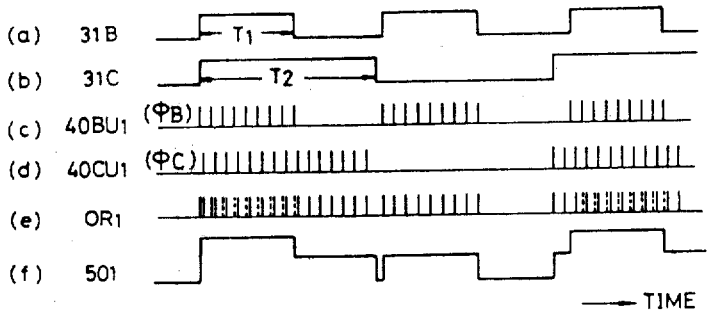
FIGS. 15 (a) through 15 (f) are timing charts for explaining operations of related circuit portions shown in FIGS. 13 and 16.

If two or more keys of the same octave are simultaneously depressed, pulse outputs having both close and wide intervals are produced from the OR circuits $OR_1$-$OR_{20}$. Assume, for example, that keys for the note C and the note B at the first octave $U_1$ of the upper keyboard are simultaneously depressed. Since relation between the square wave frequencies from the oscillators 31C and 31B is as shown in FIGS. 15 (a) 15 (b), the AND circuits 40$CU_1$ and 40$BU_2$ produce outputs are shown in FIGS. 15 (c) and 15 (d). Although the signals in FIG. 15 are shown in a diminished time scale as compared with the signals in FIG. 14, the intervals of the selected note pulses $\phi$C and $\phi$B are not in exact proportion to that shown in FIG. 14. As will be apparent from the figure, periods $T_1$, $T_2$ during which the note pulse $\phi$C is intermittently selected coincide with periods $T_1$, $T_2$ of the musical tone frequency. The outputs of the AND circuits 40$CU_1$ and 40$BU_1$ are applied to the OR circuit $OR_1$. Since the note pulses $\phi$C and $\phi$B have different time slots, the outputs of the AND circuits 40$CU_1$ and 40$BU_1$ are combined in the OR circuit $OR_1$ into a composite signal as shown in FIG. 15 (e) which consists of pulses of a close interval and pulses of a wide interval.

The composite signal produced from the OR circuit $OR_1$ is applied to a clock removal filter 501 where the note pulse component is removed and an audio frequency signal component whose level is high in a high pulse density portion and low in a low pulse density portion is delivered out. It will be understood that this audio frequency signal component is substantially the same as a waveshape formed by overlapping the waveshapes of FIGS. 15 (a) and 15 (b) together in an analog manner, namely a waveshape formed by overlapping the tone source frequencies.

Referring to FIG. 16, the outputs of the clock removal filters 501-520 are respectively applied to corresponding tone color control filters 601-620 where the signals are controlled in their tone in accordance with the kind of octave. Frequency levels of the 4 foot tone and the 8 foot tone are added together by each of the octave through resistors $R_1$, $R_2$ and thereafter are applied to the tone control filters for the 8 foot tone. This arrangement is provided for forming a step-wise waveshape including abundant harmonic content. The outputs of the tone color control filters 601-620 are separately adjusted in volume in volume control resistors 71-76 by each of the keyboards and thereafter are sounded from an audio system 80.

Figure 17:
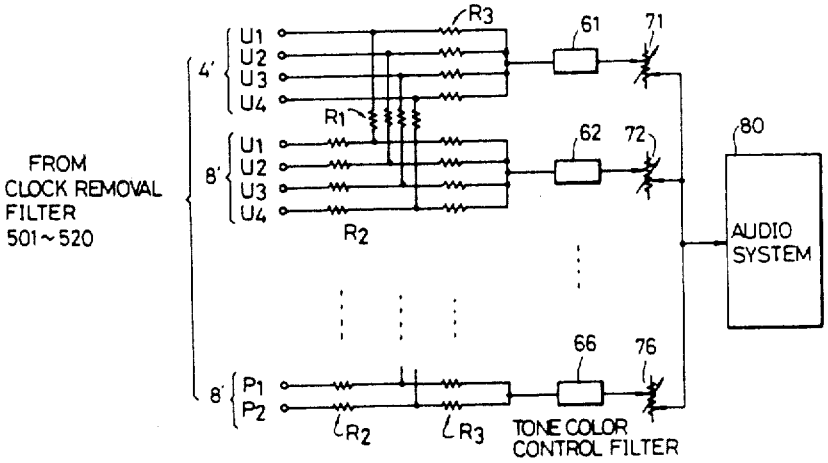
FIG. 17 is a circuit diagram showing a modified example of a circuit portion of the embodiment shown in FIG. 16.

In the example shown in FIG. 16, the tone color control is made by the kind of octave. The tone color control may, however, be made by the kind of keyboard as shown in FIG. 17. For this purpose, the example shown in FIG. 17 is constructed in such a manner that the outputs of the clock removal filters 501-520 are applied to common keyboard tone color control filters 61-66 through a resistor $R_3$ by each keyboard.

What is claimed is:

1. An electronic musical instrument comprising:

a tone source signal generator for simultaneously generating a plurality of square wave tone signals, each of an audible frequency corresponding to a respective note of a scale having several octaves and each on a separate output of said tone source signal generator;

a sequence pulse generator having a plurality of separate outputs, each corresponding to a respective separate output of said tone source signal generator, said sequence pulse generator being operative in repetitive cycles to sequentially produce in each cycle a respective sequence pulse at each separate output thereof in the order of sequence of the notes of said scale, the sequence pulses produced at each said separate output having an ultra-audible repetition frequency;

a plurality of AND circuits equal in number to the number of separate outputs of said tone source signal generator, each AND circuit being directly connected at its input to a respective one of said tone source signal generator outputs;

a key switch circuit including respective key switches for each note of said scale, each key switch being operable upon depression of its associated note key to connect the corresponding separate output of said sequence pulse generator to the input of the AND circuit to which the corresponding separate output of said tone source signal generator is directly connected, whereby each AND circuit will pass to its output all sequence pulses received at its input from said sequence pulse generator by way of said key switch circuit during the duty cycles of the tone signal received at the AND circuit input; and an OR circuit connected in common at its input to all of the outputs of the respective AND circuits for combining the sequence pulses at all said AND circuit outputs and thereby obtaining at the OR circuit output a train of tone signal pulses corresponding to the depressed keys.

2. An electronic musical instrument as defined in claim 1 which further comprises a low pass filter circuit for receiving the output signals of said OR circuit and removing the high frequency pulses included in said output signals.

3. An electronic musical instrument comprising:

means for sequentially and individually generating note pulses occupying different time slots from each other within one octave;

means for sequentially and individually generating octave pulses occupying different time slots depending upon the kind of octave, each time slot being equal to a period of time for one octave of said note pulses;

a keyboard matrix circuit for connecting key switches for repective keys to a plurality of column lines and row lines corresponding to the notes and octaves of the keys, causing each note pulse to be applied to a corresponding one of said column lines and producing outputs from said row lines upon depression of the keys;

a tone signal generator for producing frequency signals corresponding to the notes of the keys and having periods accommodating said different time slots of said octave pulses; and a plurality of AND circuits each being provided for a corresponding one of said keys each AND circuit receiving at its inputs said output from a key switch and said frequency signal corresponding to the note of the key, and, upon depression of the key, periodically producing a note pulse corresponding to the key in joint response to the output of said row line, an octave pulse representing the kind of octave to which the key belongs and a frequency signal corresponding to the note of the key, whereby a tone source signal corresponding to the depressed key is produced from said AND circuits.

4. An electronic musical instrument as defined in claim 3 which further comprises a plurality of OR circuits each being provided for one of respective keyboards and receiving the outputs of the AND circuits provided for the same keyboard for controlling tone color and volume of the tone source signal by each keyboard.

5. An electronic musical instrument comprising:

means for sequentially and individually generating note pulses occupying different time slots from each other within one octave;

a keyboard matrix circuit for connecting key switches for respective keys to a plurality of column lines and row lines corresponding to the notes and octaves of the keys, causing each note pulse to be applied to a corresponding one of said column lines and producing outputs from said row lines upon depression of the keys;

a tone source signal generator for producing frequency signals corresponding to the notes of the keys and having periods accommodating said different time slots of said note pulses; and a plurality of AND circuits each being provided for a corresponding one of said keys each AND circuit receiving at its inputs said output from a key switch and said frequency signal corresponding to the note of the key, and, upon depression of the key, periodically producing a note pulse corresponding to the key in joint response to the output of said row line, a note pulse representing the note of the key and a frequency signal corresponding to the key, whereby a musical tone waveshape is produced on the basis of the note pulse periodically selected in said AND circuit.

6. An electronic musical instrument as defined in claim 5 which further comprises a plurality of OR circuits, each being provided for one of the octaves and receiving the outputs of the AND circuits provided for the same octave for controlling tone color and volume of the tone source signal by each octave.

7. An electronic musical instrument comprising:

a plurality of AND circuits and key switches, each AND circuit and key switch corresponding to a respective one of a plurality of musical pitches in a pitch range spanning a plurality of octaves having like pluralities of notes, each AND circuit producing and AND-logical output signal upon receipt of first, second, third and fourth input signals in a predetermined time relationship;

a tone source signal generator for providing said first input signal as a sequence of tone pulses of a first time duration occurring at an audible repetition frequency according to the frequency of said respective one of said plurality of musical pitches;

an octave pulse generator for providing said second input signal as a sequence of octave pulses of a second time duration substantially less than said first time duration and occurring in a time slot of said tone pulses which is allocated exclusively to the octave of said respective one of said plurality of musical pitches;

a note pulse generator for providing said third and fourth input signals as identical sequences of note pulses of a third time duration substantially less than said second time duration and occurring in a time slot of said octave pulses which is allocated exclusively of the note of said respective one of said plurality of musical pitches, said fourth input signal being received by the AND circuit corresponding to said respective one of said plurality of musical pitches only upon actuation of the key switch which also corresponds to said respective one of said plurality of musical pitches; and means for adding together all the AND-logical output signals produced by said AND circuits to thereby provide a composite tone signal having an audio frequency component substantially the same as that which would be formed by superimposing upon one another the tone pulse input signals of the AND circuits having actuated corresponding key switches.

8. An electronic musical instrument comprising:

a note pulse generator having a plurality of separate outputs, each corresponding to a respective note of one octave, said note pulse generator being operative in repetitive cycles to sequentially produce in each cycle of its operation a respective note pulse at each separate output thereof in the order of sequence of the notes in said octave, the note pulses produced at each separate output of said note pulse generator having an ultra-audible repetition frequency;

an octave pulse generator having a plurality of separate outputs, each corresponding to a respective octave of a plurality of octaves, said octave pulse generator being operative in repetitive cycles to sequentially produce in each cycle of its operation a respective octave pulse at each separate output thereof, the octave pulses produced at each separate output of said octave pulse generator having an ultra-audible repetition frequency and a pulse width equal to the period of one operating cycle of said note pulse generator;

a tone source generator for simultaneously generating a plurality of square wave tone signals, each of an audible frequency corresponding to a respective note in a respective octave and each on a separate output of said tone source signal generator;

a plurality of AND circuits equal in number to the number of separate outputs of said tone source signal generator, each AND circuit being directly connected at its input to a respective one of said tone source signal generator outputs, while each separate output of said note pulse generator and each separate output of said octave pulse generator are directly connected to those AND circuit inputs that are directly connected to a corresponding separate output of said tone source signal generator;

a key switch matrix circuit comprising a plurality of column lines and a plurality of row lines, each line of one plurality of lines being connected to a respective one of said separate outputs of said note pulse generator for receiving the note pulses produced thereat, each line of the other plurality of lines corresponding to one of said plurality of octaves and being directly connected to the input of each AND circuit whose input is already directly connected to receive a square wave tone signal corresponding to a note in said one of said plurality of octaves, and a plurality of key switches, one for each note in each octave and each operable upon depression of a respective key to connect a particular line of said one plurality of lines to a particular line of said other plurality of lines, thereby supplying note pulses corresponding to the note of the depressed key to the input of an AND circuit already being supplied at its input with note pulses, octave pulses and a square wave tone signal, all corresponding to said note, from the respective generators, said AND circuit only passing to its output those note pulses which occur both during the pulse times of the octave pulses and during the duty cycles of the square wave tone signal; and an OR circuit connected in common at its input to all of the outputs of the respective AND circuits for combining the note pulses at all said AND circuit outputs and thereby obtaining at the OR circuit output a train of tone signal pulses corresponding to the depressed keys.

*9. A time division multiplexed keyboard musical instrument, comprising:*

*a keyboard having keys each corresponding to a musical note,*

*a multiplexed tone source means for producing a time division multiplex signal having a plurality of time slots corresponding to said keyboard, each of said time slots being allocated to a corresponding individual key of said keyboard, said signal in each of those time slots corresponding to selected keys consisting of amplitude samples of a harmonic-rich tone source waveform having a note frequency designated by the individual selected key allocated to that time slot, there being no amplitude samples in the remaining time slots which correspond to non-selected keys,*

*a single format filter connected directly to receive said time division multiplex signal, said single formant filter controlling the frequency components of all of the time division multiplexed tone source waveform amplitude samples and providing as an output a musical tone signal having a predetermined tone color, and*

*an audio system receiving said musical tone signal and producing corresponding audio musical sounds therefrom.*

* * * * *